US006988070B2

(12) United States Patent
Kawasaki et al.

(10) Patent No.: US 6,988,070 B2
(45) Date of Patent: Jan. 17, 2006

(54) VOICE CONTROL SYSTEM FOR OPERATING HOME ELECTRICAL APPLIANCES

(75) Inventors: Toshinobu Kawasaki, Hirakata (JP); Yoshiyuki Komoda, Suita (JP); Yoshihiko Tokunaga, Amagasaki (JP); Yukio Okada, Toyonaka (JP); Hirotatsu Shinomiya, Sakai (JP); Takehito Hayami, Dazaifu (JP)

(73) Assignee: Matsushita Electric Works, Ltd., Kadoma (JP)

( * ) Notice: Subject to any disclaimer, the term of this patent is extended or adjusted under 35 U.S.C. 154(b) by 795 days.

(21) Appl. No.: 09/852,727

(22) Filed: May 11, 2001

(65) Prior Publication Data

US 2001/0041982 A1    Nov. 15, 2001

(30) Foreign Application Priority Data

May 11, 2000    (JP)    .............................. 2000-139038

(51) Int. Cl.
*G10L 15/22*    (2006.01)
*G10L 21/06*    (2006.01)
(52) U.S. Cl. ..................................... 704/275; 704/270
(58) Field of Classification Search ................ 704/275, 704/270.1; 340/852.72
See application file for complete search history.

(56) References Cited

U.S. PATENT DOCUMENTS

| 5,086,385 | A | | 2/1992 | Launey et al. |
| 5,109,222 | A | * | 4/1992 | Welty ..................... 340/825.72 |
| 5,878,394 | A | | 3/1999 | Muehling |
| 6,052,666 | A | | 4/2000 | Diehl et al. |
| 6,198,479 | B1 | * | 3/2001 | Humpleman et al. ........ 345/733 |
| 6,513,006 | B2 | * | 1/2003 | Howard et al. ............. 704/257 |
| 6,535,854 | B2 | * | 3/2003 | Buchner et al. ............. 704/275 |
| 6,580,950 | B1 | * | 6/2003 | Johnson et al. ............... 700/17 |
| 6,735,619 | B1 | * | 5/2004 | Sawada ...................... 709/212 |
| 2001/0034205 | A1 | * | 10/2001 | Tarr .......................... 455/3.06 |
| 2002/0069063 | A1 | * | 6/2002 | Buchner et al. ............ 704/270 |

FOREIGN PATENT DOCUMENTS

| CN | 1157444 | 8/1997 |
| EP | 0 496 492 | 7/1992 |
| EP | 0 814 393 | 12/1997 |
| EP | 0 911 808 | 4/1999 |
| WO | WO 98/12685 | 3/1998 |

OTHER PUBLICATIONS

G. Evans, IEEE Transactions on Consumer Electronics, vol. 37, No. 3, pps. 395-400, "Solving Home Automation Problems Using Artifical Intelligence Techniques," Aug. 1991, no day.

* cited by examiner

*Primary Examiner*—Susan McFadden
(74) *Attorney, Agent, or Firm*—Oblon, Spivak, McClelland, Maier & Neustadt, P.C.

(57) ABSTRACT

A voice control system for managing home electrical appliances includes a home agent server (HAS) connected to the home electrical appliances, a microphone and a speaker linked to the agent server through an in-house network. An transaction processing (TP) program runs on HAS and interprets the user's voice request to find a destined appliance and a manner of control the same, and performs the requested control to the destined appliance. The result is notified to the user by means of a voice message.

20 Claims, 6 Drawing Sheets

VOICE CONTROL SYSTEM FOR OPERATING HOME ELECTRICAL APPLIANCES

BACKGROUND OF THE INVENTION

1. Field of the Invention

The present invention relates to a voice control system for operating home electrical appliances, and more particularly a speech-based home automation system for managing the home electrical appliances

2. Description of the Prior Art

There have been proposed a doorphone system which is capable of supervising home electrical appliances connected to a master station of the system through an in-house network. In this system, the control of the appliances are made only on the side of the mater station, i.e., by manipulating buttons or switches while viewing a monitor screen on the master station. Accordingly, the system is not easily accessible by elders or weak-eyed persons.

SUMMARY OF THE INVENTION

In view of the above insufficiency, the present Invention has been achieved to provide a voice control system which is easy to manipulate for operating home electrical appliances.

The system in accordance with the present invention comprises a home agent server (HAS) adapted to be installed within a house and connected to the home electrical appliances, a combination of a microphone and a speaker linked to the HAS through an in-house network, and a voice recognition means which recognizes a user's voice request received at the microphone. Also included in the system is a transaction processing (TP) program which is executable by the HAS to manage the electrical appliances. The TP program has an instruction interpreting module which determines from the user's voice request a particular instruction indicating a destined appliance and a method for controlling the destined appliance, and provides an output command for controlling the destined appliance in accordance with the particular instruction. With this system, the user's voice request can be processed to control the designated appliance without resorting to manipulating buttons or switches, which makes it easy to mange the appliances even by elders, weak-eyed persons or unskilled persons not familiar with the mechanism of the system.

In one version, the TP program is configured to generate a control signal as the output command which controls the destined appliance. In other words, the TP program stays on the HAS to issue the control signal therefrom.

Alternately or in addition to the stationary function, the TP program may be configured as a mobile agent program (mobile TP program) which is capable of moving from the HAS to a local computer terminal included in the destined appliance in response to the output command such that it can be executed at the destined appliance for effecting a spot control thereof.

The mobile TP program has a migration module which analyzes the instruction to seek an associated address of the destined appliance, i.e., the local computer terminal included therein and moves the mobile TP program itself to the local computer terminal to be executed thereat. In order to make the mobile TP program versatile in its function, it may include a voice recognition module which realizes the voice recognition means. This is particularly advantageous when the system includes more than one HAS since each HAS can be dispensed with the voice recognition means separate from the mobile TP program. Likewise, the program may further include a text composer providing a text associated with a particular control of the appliance, and a speech synthesis module which converts the text into a voice message to be issued from said speaker for confirmation of the acceptance of the user's voice request and/or the completion of the requested control.

Preferably, the HAS is provided with a communication interface for linking the HAS to the in-house network as well as to an outer information network such as the Internet for intercommunication with sites linked through the information network. Further, the HAS includes an address table storing addresses of the appliances and sites which are sought by the mobile TP program running on the HAS to designate a destined appliance or site where an intended process demanded by the user's request is to be executed. That is, the migration module firstly seeks the address of the destined appliance or site with reference to the address table, and then allows the mobile TP program itself to move to the destined appliance or site for execution of the mobile TP program thereat to achieve the intended process demanded by the user's request.

The system may further include human presence sensors which are to be installed in different rooms of the house and linked to the HAS so as to provide to the HAS a detection signal indicative of a particular one of the rooms where the user is present. In this connection, one of the HAS and the TP program is designed to include a room locating module which identifies the particular room with reference to the detection signal and instructs to issue the voice message from the speaker belonging to thus identified room. This is particularly useful to give the direct reply to the user when the user's request is input to the microphone carried on a mobile terminal which is linked to the in-house network by radio.

Further, one of the TP program and the HAS may further include a voice locating module which locates a place of the user issuing the voice request received at the microphone and instructs to issue the voice message from the speaker belonging to thus located place. That is, the voice locating module identifies the user and then estimates the room where the user is expected to be. Thus, the voice message from the system can be delivered to the user in the estimated room.

Preferably, the HAS includes a personal information table storing a relation between individual users and the appliances allocated to be accessible by the individual users. In association with the personal information table, the TP program is configured to include a user identification module which identifies the user from the user's voice request, and an access permission module which selects the appliance allocated to the identified user with reference to the personal information table and limits the TP program to the execution for the allocated appliance. Thus, the appliance can be accessible only by the authorized user or users, assuring safe management of the home appliances while avoiding an undesired control over the appliance not intended to be accessible by an unfamiliar person such as a child or a visitor.

Further, the system may include a plurality of dedicated TP programs which are allocated respectively to individual users for limiting one or more of the appliances predetermined to be accessible by the individual users. In this connection, the user identification module is provided on the HAS to identify the user from the voice request, selects one of the dedicated TP programs allocated to the identified user, and allows the dedicated TP program to be executed. Thus, the user's voice request can be handled by the dedicated TP program allocated to the user issuing that request, realizing an effective and consistent management of the home appliances.

When the dedicated TP programs are each designed as the mobile agent program capable of moving from the HAS to the destined appliance, each TP program can be made compact sufficient to rapidly move around the appliances for instant execution and therefore efficient management of the home appliances.

Further, in order to make the TP program compact, the HAS is designed to include at least one, and preferably all of the voice recognition means, the text composing means, and the speech synthesis means.

The HAS may additionally include a communication interface for linking the HAS to an outer information network such as the Internet for intercommunication with sites linked to the information network. For this purpose, the HAS includes a site address list storing addresses of the sites which are referenced by the TP program to seek a destined site when an intended process demanded by the user's voice request is to be executed. Thus, the TP program can be executed to communicate with the destined site for obtaining services provided by the site.

The system may further include a personal computer equipped with a display in addition to the microphone and the speaker. The personal computer is linked to the HAS through the in-house network for transmitting the user's voice request received at the incorporated microphone to the TP program running on the HAS. In this case, the TP program is given a function of transmitting the text provide by the text composer to the display of the personal computer for visual confirmation of the acceptance of the user's voice request and/or the completion of the requested control.

The HAS may further include a phone interface to a public telephone network for intercommunication with a mobile phone carrying a specific TP program which is a mobile agent program capable of moving from the mobile phone to the HAS or the local computer terminal of the appliance so as to be executed thereat. The specific TP program is designed to accept a user's voice request for managing the appliance when running on the mobile phone, and includes a voice recognition module, an instruction interpreting module, and a migration module. The voice request recognized at the voice recognition module is interpreted at the instruction interpreting module which prepares a particular instruction indicating a destined appliance and a method for controlling the destined appliance. In response to the instruction, the migration module acts to move the specific TP program to the HAS or the local computer terminal for achieving the method for the destined appliance. With the inclusion of the mobile phone running the specific TP program, the user can manage the home appliances over the telephone network from outside of the house.

The microphone and the speaker may be mounted in a switch box installed in a house, in a ceiling receptacle in the house for connection with a lighting fixture, or in the lighting fixture itself.

The HAS is preferably packed into a home information and power distribution center which accommodates a distributor connected between a utility line and in-house branched power lines, a telephone interface for connection between a public telephone network and an in-house telephone line, and an information interface for connection between a public information network and an in-house information network. The in-house network is realized by the power lines which allows the output command from the HAS to be transmitted therethrough to the destined appliances. Thus, the HAS can be centralized together with the power lines, the telephone line, while the in-house network is realized by making the use of the power lines.

These and still other objects and advantageous features of the present invention will become more apparent from the following detailed description of the embodiment when taken in conjunction with the attached drawings.

DETAILED DESCRIPTION OF THE EMBODIMENTS

Figure 1:
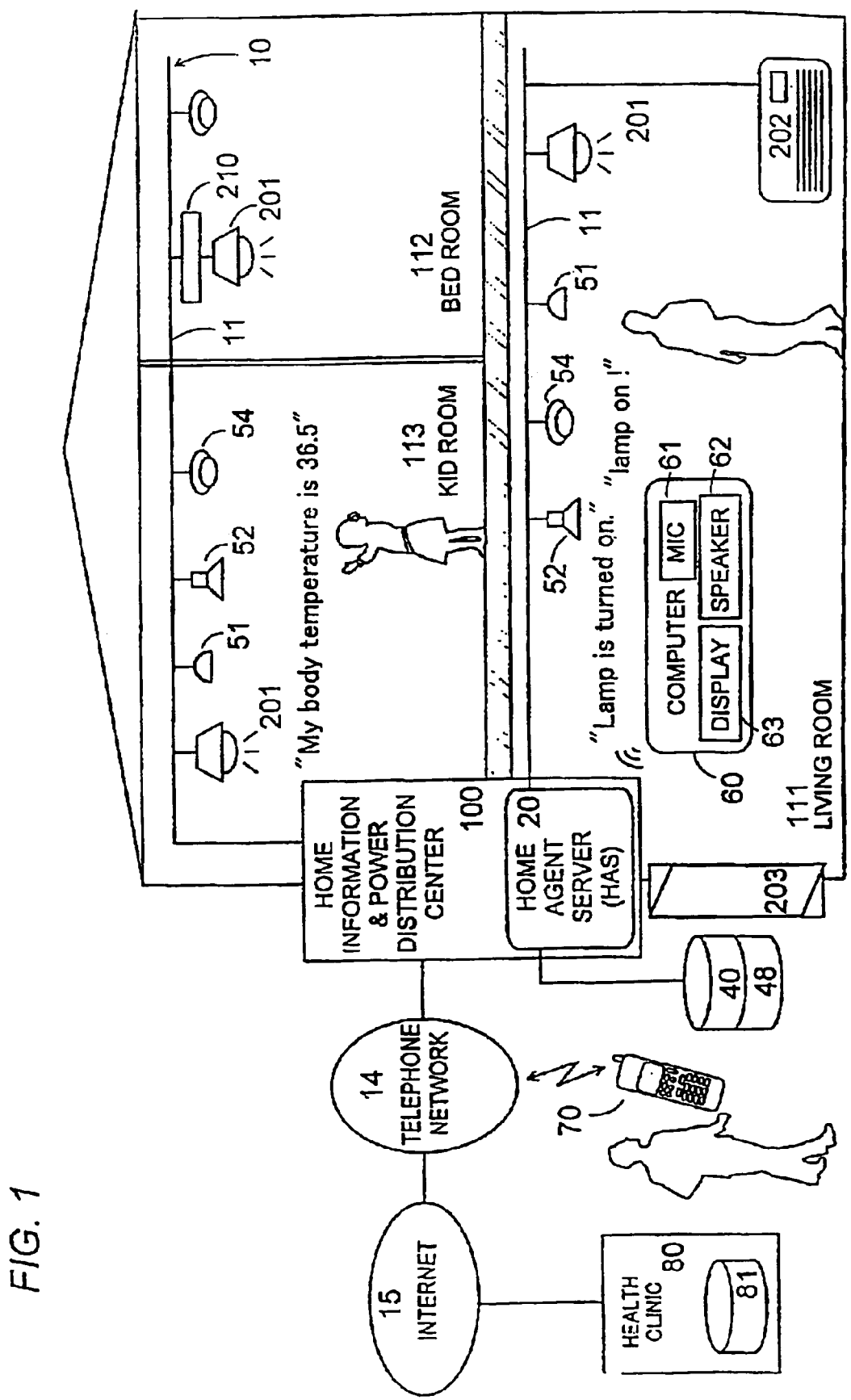
FIG. 1 is a diagram illustrating a voice control system for operating home electrical appliances in accordance with a preferred embodiment of the present invention.

Referring now to FIG. 1, there is shown a voice control system in accordance with the preferred embodiment of the present invention. The system has a home agent server (HAS) 20 which runs a transaction processing (TP) program for managing home electrical appliances including for example, a lighting fixture 201, an air conditioner 202, a door 203 with an electrically actuated latch and the like. The TP program is basically executed by the HAS 20 to give a control over a destined appliance in response to a user's voice request, as will be later discussed in detail. The HAS 20 is mounted in a home information and power distribution center 100, a gate for connection of an in-house network 10 and an in-house telephone network to an outside telephone network 14 as well as an information network 15 such as the Internet. In the illustrated embodiment, the in-house network is realized by power distribution lines 11 branched from a distributor accommodated within the center 100 and leading to individual rooms, for example, living room 111, bed room 112, and a kid room 113 for energizing home appliances installed therein. The HAS 20 includes communication interfaces 25 and 26 for the outside telephone network and the information network 15 directly or through the telephone network 14 in addition to the in-house network 10. Also the HAS 20 is connected to a home maintenance database 40 storing various information relating to the appliances and residents in the house, as well as connected to a private information service database 48 designed to provide information services to subscribed users through the information network 15 or through a private line. The information service includes a weather report dictionary search, and various services available in the today's information network technology.

Also included in the system are sets of a microphone 51 and a speaker 52 each provided in each room and like place and linked to the HAS 20 through the in-house network 10. The microphone 51 receives the user's voice request and transmits it to the HAS 20 where the TP program is executed for managing the destined appliance in a manner as specified by the voice request, while the speaker 52 issues a voice message generated at the HAS 20 for confirmation of the acceptance of the user's request and/or the completion of the requested control. The microphone and speaker set is mounted in a ceiling or wall, in a switch box provided for operating the appliances, in a ceiling receptacle 210 for connection with the lighting fixture, and within the lighting fixture or the like appliance itself. Further, the system optionally include one or more personal computers 60 and one or more human presence sensor 54. The personal computer 60, which is equipped with a microphone 61, a speaker 62, and a display 63, is linked through wire or radio to the in-house network 10 for intercommunication with the HAS 20. The human presence sensor 54 is connected to the in-house network 10 and provides to the HAS 20 a human detection signal whether the human is presence in which room. The detection signal is processed by the TP program to give an extra function as will be discussed later.

The system may further include a mobile phone 70 loaded with a specific TP program which receives the user's voice request at an incorporated microphone to manage the home appliances through the telephone network 14 and the HAS 20. Additionally, the system can be connected to a data service center 80 such as the one provided in a hospital for data exchange between the service center 80 and the users in the house by way of the Internet 15. The data service center 80 includes a database 81 which is accessible by authorized users of the system to allow the user to retrieve and update records about the users.

Prior to discussing the detailed operations of the HAS 20 and the TP program, it is noted that the system can utilize two kinds of the TP programs, one running solely on the HAS 20 for managing the appliances of non-sophisticated type, and the other being a mobile agent program capable of moving from the HAS 20 to the appliance of a sophisticated type equipped with a local computer terminal where the TP program is executed for control of the appliance. In the illustrated embodiment, the appliance of the sophisticated type is shown as the air conditioner 202, while the typical appliances of the non-sophisticated type include the lighting fixture 201 and the door 203. For control of the non-sophisticated appliances, the TP program (hereafter referred to as the stationary TP program ) operates to issue a control signal which is transmitted through the in-house network 10 to turn on and off the destined appliance. On the other hand, the TP program of the mobile type (herein after referred to as the mobile TP program) is itself sent through the in-house network 10 to the destined appliance so as to be executed thereat for control of the appliance and is sent back to the HAS after completion of the requested control.

It is noted in this connection that the TP programs are each provided in the form of an implementation-independent program which is, for example, written by the Java programming language capable of being executed on multiple operating systems loaded with the Java virtual machine as well as an associated software platform known as the Java's class loading model responsible for serialization, remote method invocation, multithreading and reflection.

Figure 2:
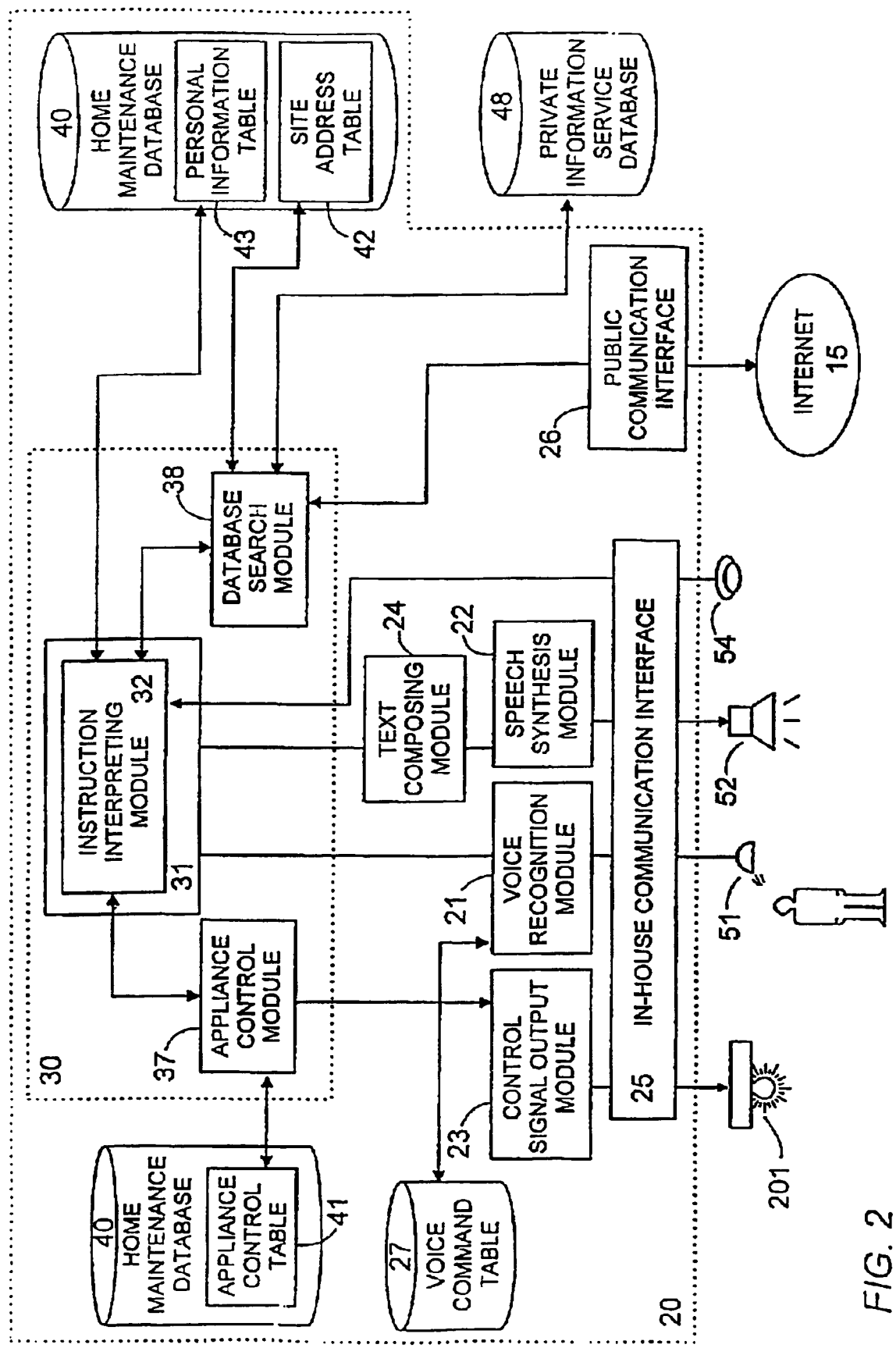
FIG. 2 is a block diagram illustrating a structure of a home agent server (HAS) utilized in the above system.

FIG. 2 illustrates the structure of the HAS 20 running the stationary TP program 30. In addition to the TP program, the HAS 20 is loaded with a peripheral control program which defines a voice recognition module 21, a speech synthesis module 22, a text composing module 24, a control signal output module 23, an in-house communication interface 26, and a public communication interface 26. The voice recognition module 21 receives the user's voice request, for example, "Lamp on" received at one of the microphones 51 and extracts the content thereof with reference to a voice command table 27 storing various voice commands and the contents related to the respective commands. The speech synthesis module 22 is provided to generate the voice message from a text provided by the text composing module 24. The voice message is then sent to the destined speaker 52 for giving vocal confirmation of the acceptance of the user's voice request and/or the completion of the requested control. The control signal output module 23 is provided to generate the control signal in accordance with an output command from the TP program 30 for control the non-sophisticated appliance 201 or 203. The control signal is sent through the in-house network 10 to the destined appliance for control thereof. For this purpose, the in-house communication interface 25 is designed to send the control signal superimposed on a supply voltage to the appliance. The public communication interface 26 allows the TP program 30 to access the public information network or the Internet 16 in accordance with the user's voice request for obtaining requested results or services from various sites joining the Internet.

Figure 3:
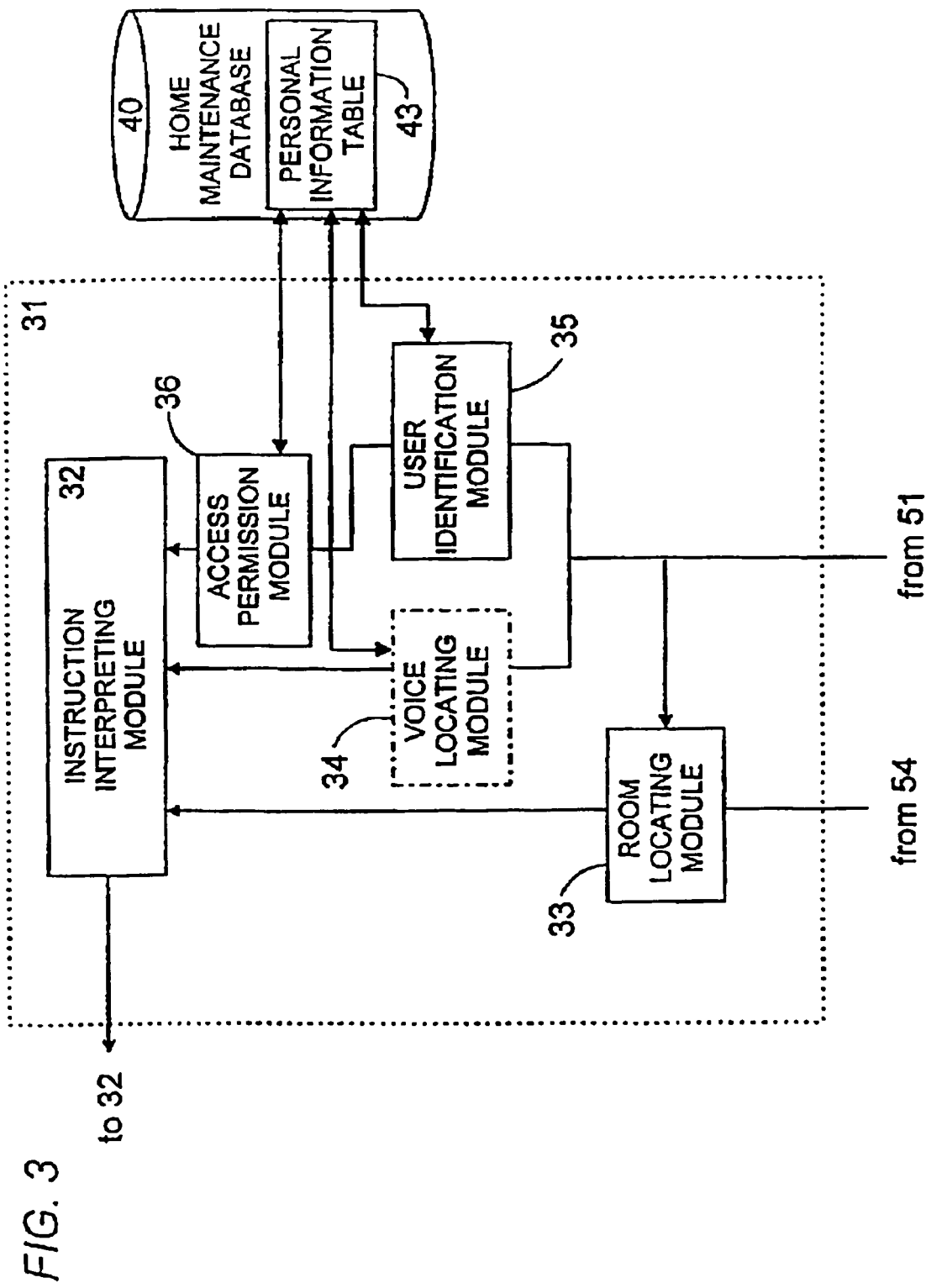
FIG. 3 is a block diagram illustrating a structure of a transaction processing (TP) program running on the HAS.

As shown in FIG. 2, the stationary TP program 30 includes a control center 31 with an instruction interpreting module 32, an appliance control module 37, and a database search module 38. As shown in FIG. 3, the control center 31 further includes a room locating module 33, a voice locating module 34, a user identification module 35, and an access permission module 36. The instruction interpreting module 31 analyzes the content of the voice request to determine a particular instruction intended by the user's request. As shown in the flow chart of FIG. 4, it is firstly determined whether the instruction relates to the control of the appliance or to the information service. When, the instruction relates to the control of the appliance, then the module 31 determines the destined appliance and a requested method for control thereof. Then, the application control module 37 takes over to reference an appliance control table 41 to fetch control information, i.e., argument or parameter related to the destined appliance, and generates and outputs the control signal for controlling the destined appliance in a manner as requested by the user. Thereafter, the module 37 monitors a condition of the destined appliance to receive a control result therefrom, and passes it to the module 32 which in turn instructs the text composing module 24 to generate a text indicating the control result. The text is then sent to the speech synthesis module 22 to be converted into the voice message which is sent to the speaker 52 for giving the vocal confirmation of the result to the user. The instruction interpreting module 32 also functions to instruct the text composing module 24 to provide a text expressing an acceptance of the user's request. The text is subsequently converted at the speech synthesis module 22 into a corresponding vocal acceptance message which is issued from the speaker 52.

The vocal message is sent to the speaker 52 which is installed in the same room where the microphone 51 receives the user's voice request. However, when the user's request is received at the microphone on the personal computer 60 of a mobile type such as a wearable computer, the vocal message is sent to the speaker of the room where the user is present. For this purpose, the room locating module 33 is included in the control center 31 (FIG. 3) to find the room where the user is present based upon the detection signal sent from the human presence sensor 54, when the user's voice request is not associated with a tag indicating the location of the microphone. Based upon the address or data of thus found room, the control center 31 designates the speaker 62 for issuing the voice message to the user in that room. Further, the room locating module 33 also gives the information to identify the correct one of the appliances when there are more than one appliances of the same kinds distributed in different rooms, for example, the lighting fixtures, and the user's request lacks the indication of the particular room, for example, "Lamp on". In such case, the room locating module 33 identifies the room and passes the data to find the correct address of the appliance in the room for reliable control thereof.

Alternately or in addition to the room locating module, the control center 31 may include the voice locating module 34, as shown in FIG. 3. The voice locating module 34 collates a voice print of the voice request with data stored in a personal information table 43 included in the home maintenance database 40 in order to identify the user issuing the request, and then estimates the room where the user is expected be also with reference to the personal information table 43 storing the relation between the user and the associated room. Thus, the speaker of thus estimated room is selected by the control center 31 for issuing the voice message therefrom. Also, this estimation is utilized to find the correct appliance to be controlled in the absence of a specific designation of the room to which the appliance belongs.

Further, the control center 31 includes the user identification module 35 which identifies the user placing the request in the same manner as in the voice locating module 34. The data of thus identified user is sent to the access permission module 36 which responds to reference the personal information table 43 storing a list of various control methods for the appliances and services limited to the users. Then, the access permission module 36 gives to the instruction interpreting module 32 data indicating the permitted control methods and services accessible by the identified user, such that the module 32 can allow the execution of the instruction demanded by the user's request only with regard to the control methods or services permitted to the user.

In this connection, the system may be configured to include a plurality of dedicated TP programs 30 each of which is assigned to each of the users or residents and is specifically programmed to execute the user's request only to the appliances, methods or services allocated to be accessible by each user. In this instance, the access permission module 36 is eliminated from the system, and the user identification module 35 and the voice locating module 34 are realized by the peripheral control program running on the HAS 20 rather than by the TP program. The peripheral control program is given a function of selecting one of the dedicated TP programs in accordance with the user identified by the user identification module, and allowing the selected TP program to execute for control of the destined appliance or access to the service. Apart from the provision of the plural dedicated TP programs, the system may be modified such that one or more of the voice recognition module 21, the speech synthesis module 22, and the control signal output module 23 may be incorporated in the TP program.

Referring back to FIGS. 2 and 4, when the user's request is determined at the instruction interpreting module 32 to be related to the information service, the database search module 38 is activated to determine whether the requested information service is to access the private information database 48 or the sites on the Internet 15. In either case, the database search module 38 references a site address table 42 in the home maintenance database 40 to seek the address for access to the requested service. Then, the module 38 is enabled to access one of the private information service database 48 and the site on the Internet to receives a requested result. When the result IS a text, it is converted into the speech at the speech synthesis module 22 and is issued from the corresponding speaker 52 to notify the user of the result. When the result is a voice message, it is directly passed to the speaker.

Figure 5:
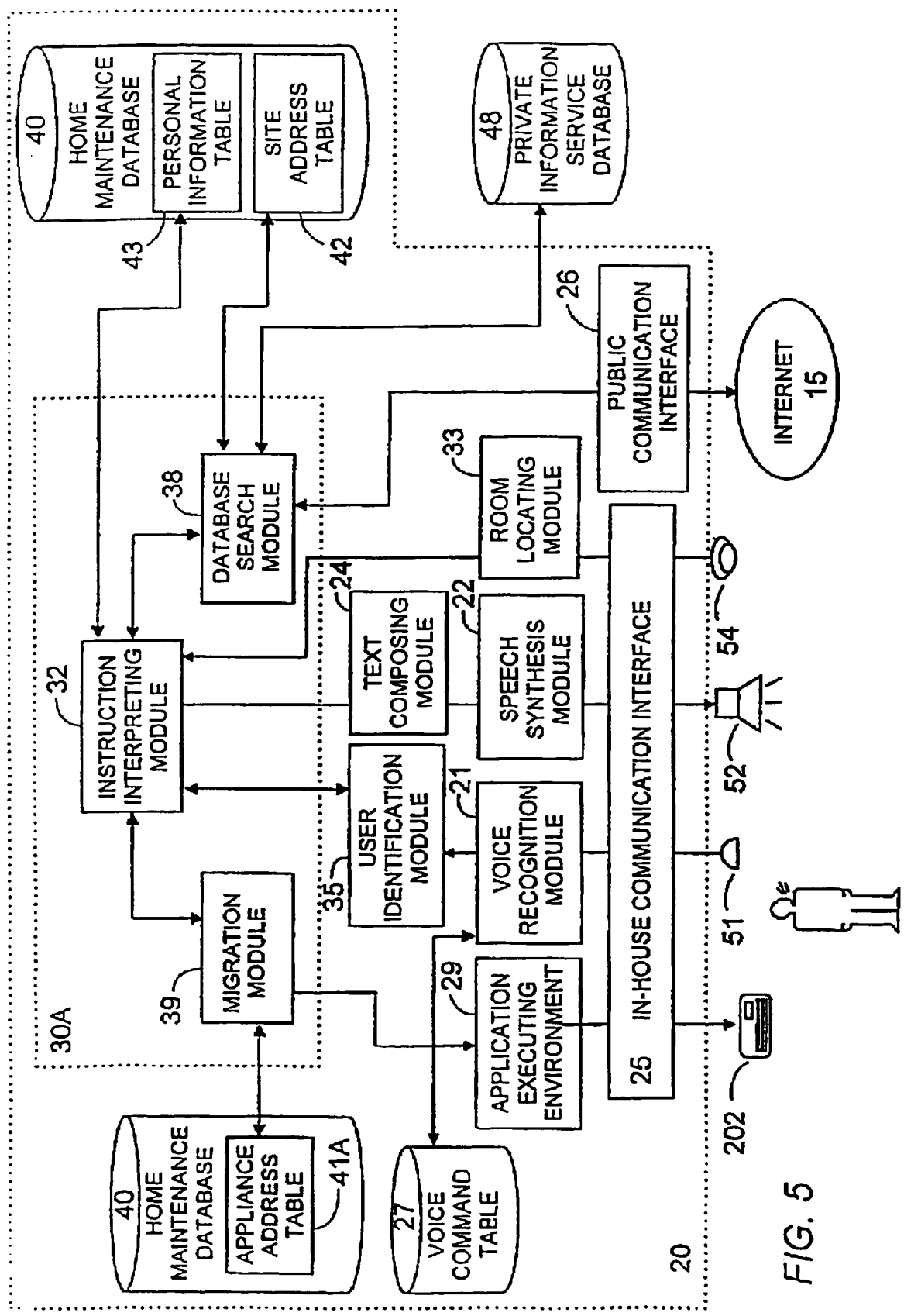
FIG. 5 is a block diagram illustrating a system configuration using a mobile TP program.
Figure 6:
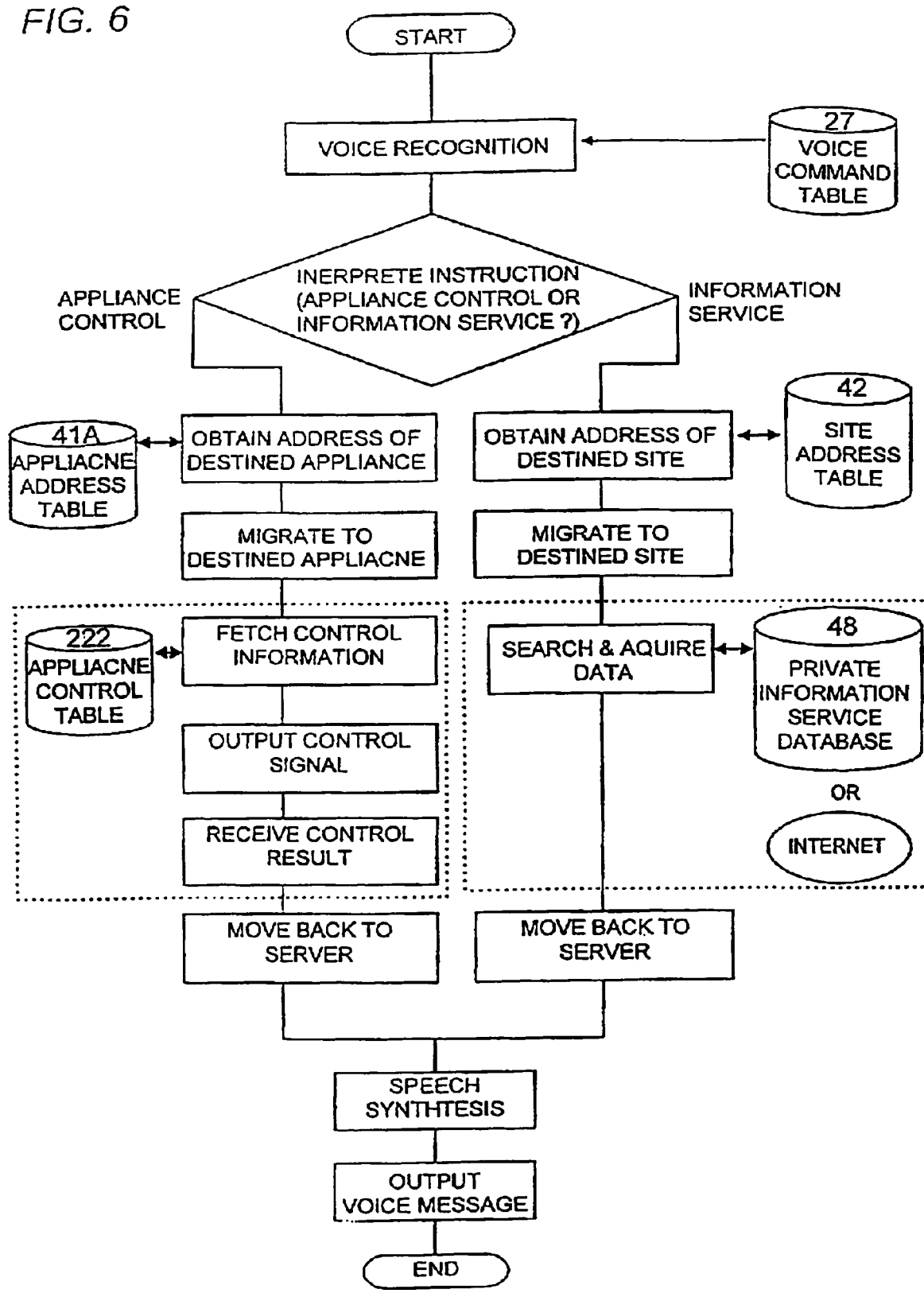
FIG. 6 is a low chart illustrating the system operation of FIG. 5.

Referring to FIG. 5, there is illustrated a system configuration when utilizing the mobile TP program 30A capable of moving from the HAS 20 to the computer terminal at the sophisticated appliance 202. In this instance, the mobile TP program 30A includes, in addition to the instruction interpreting module 32 and the database search module 38A, a migration module 39 for moving the mobile TP program 30A to the destined appliance 202, i.e., the computer terminal thereof or the private information service database 48 and allowing it to be executed for control of the appliance or acquisition of the information. As shown in the flowchart of FIG. 6, when the user's request is determined at the instruction interpreting module 32 to be related to the appliance control, the migration module 39 receives data of the destined appliance from the module 32, and references the appliance address table 41A to fetch an address of the destined appliance. Then, the migration module 39 issues an output command of moving the TP program 30A to the destined appliance. The output command is prosecuted at the application executing environment or software platform 29 running on the HAS 20 so as to move the mobile TP program 30A to the destined appliance where the mobile TP program 30A references a control table 222 incorporated in the appliance to acquire control information, i.e., argument or parameter for making the requested control, and is executed in accordance with the control information in order to output the control signal for achieve an intended result. Subsequently, the mobile TP program 30A receives the result and issues the command of moving itself back to the HAS 20. The command is prosecuted at the application executing environment of the appliance to move the mobile TP program back to the HAS 20. Thereafter, the text indicating the control result is generated at a text composing module 24 and is converted at the speech synthesis module 22 for issuing the voice message from the corresponding speaker 52. For easy confirmation of the system operation, the steps taken by the mobile TP program 30A at the destined appliance are shown to be enclosed by phantom lines.

Figure 4:
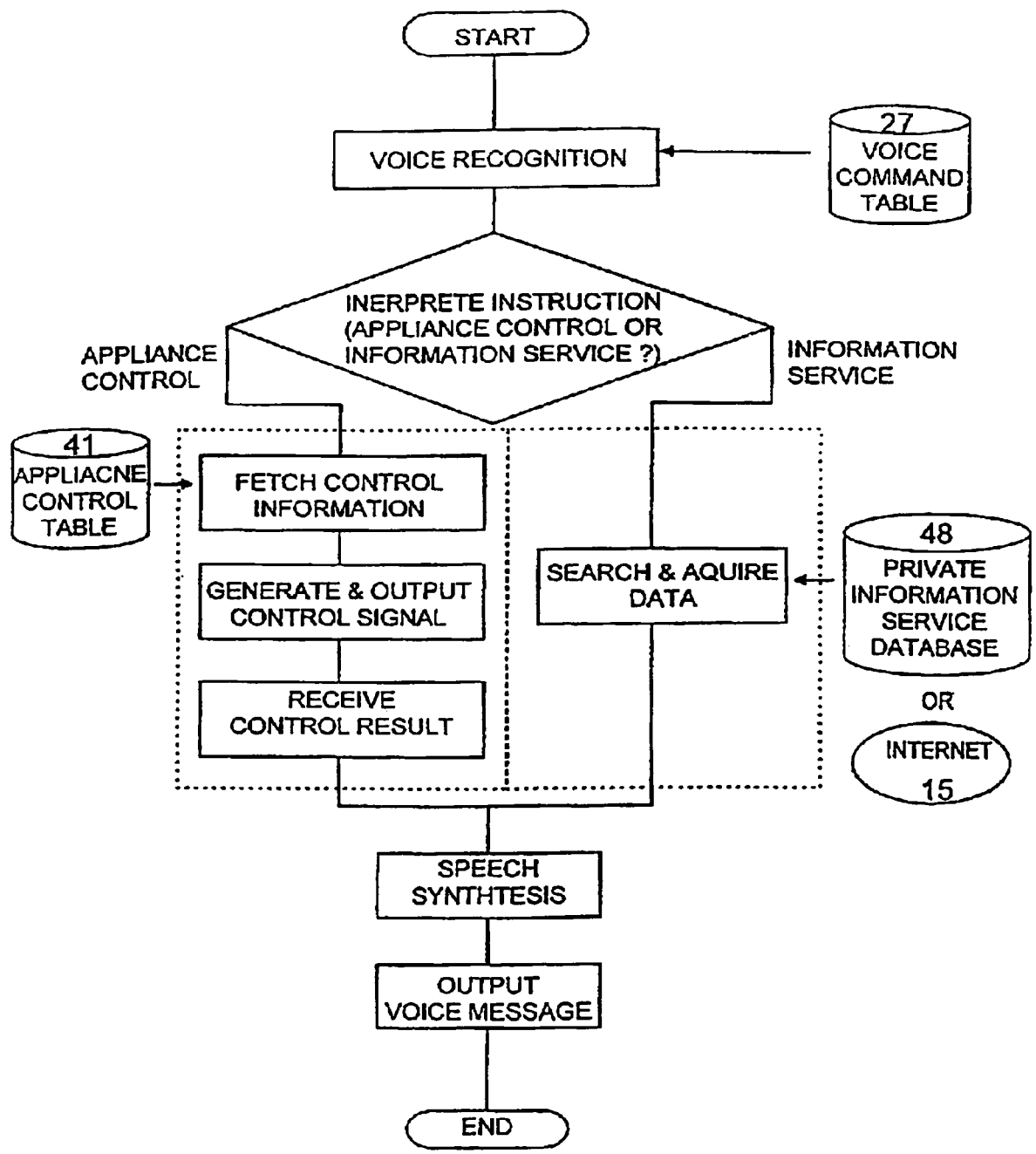
FIG. 4 is a flow chart illustrating the system operation of FIG. 2.

The speaker 62 is selected in the same manner as described with reference to FIGS. 2 to 4 in cooperation with the room locating module 33 and/or the voice locating module which are preferably realized by the peripheral control program native to the HAS rather than by the mobile TP program. Further, the mobile TP program 30A or the peripheral control program may be provided with the user identification module as explained in the above for limiting the control of the appliances according to the identified user.

In association with the HAS 20 running the mobile TP program 30A, the specific TP program carried on the mobile phone 70 is preferred to be a mobile agent program having a like voice recognition module and a like instruction interpreting module as utilized in the program native to the HAS 20. For this purpose, the mobile phone 70 is designed to provide a like application executing environment or software platform for allowing the specific TP program to move to the HAS and/or the sophisticated appliance 202 on the in-house network 10 and back to the mobile phone. Accordingly, the user's voice request received at the mobile phone 70 is accepted at the specific TP program which responds to move into the in-house network for carrying out the requested control for the destined appliance, and return to the mobile phone together with the control result for vocal notification thereof to the user on the side of the mobile phone.

When the user's request is determined at the instruction interpreting module 32 to be related to the information service, the database search module 38 is activated to determine whether the requested information service is to access the private information database 48 or the sites on the Internet 15. In either case, the database search module 38 references the site address table 42 in the home maintenance database 40 to seek the address for access to the requested service. When the private information service table 48 is designated, the migration module 39 is activated to move the mobile TP program 30A to the database 48 so that the program is executed thereat for obtaining the requested service or result. Thereafter, the program 30A moves back with the acquired result to the HAS 20. When, on the other hand, site on the Internet is designated, the mobile TP program 30A stays in the HAS 20 and actuates the database search module 38 to access to and obtain a requested service or result from the destined site. In either case, the acquired result is sent back to the user in the form of the vocal message as described before with reference to FIGS. 2 to 5.

Although the private information database 48 is preferred to allow the mobile TP program 30A to act therein for assuring smart data acquisition and data updating performance, It may be designed to respond only to inquiry from the HAS 20. One example of the former case is a health care database 81 provided in a health clinic as the data service center 80 to collect various medical data as to the users which is not only searched but also frequently updated by the user. For example, a daily updated records such as a body temperature is updated in response to the user's request followed by an expression that "My body temperature is 36.5 degrees" as illustrated in FIG. 1. In the latter case, the mobile TP program 30A knowing the address of this type of the database stays on the HAS 20 to be executed for obtaining the requested result.

Also as explained previously about the stationary TP program with reference to FIG. 2, the system may utilize a plurality of mobile dedicated TP programs each of which is assigned to each of the users or residents and is specifically programmed to execute the user's request only to the appliances, methods or services allocated to be accessible by each user. The allocation is stored in the personal information table 43.

In the illustrated example, the mobile TP program 30A is dispensed with the voice recognition module 21, the speech synthesis module 22, the text composing module 24, the user identification module 35, and the room locating module 34 so that the mobile program is made compact sufficiently to move rapidly between the HAS 20 and the destined appliance or database. However, one or any combination of these modules may be incorporated in the mobile program 30A so as to make the program multipurpose, thereby giving it versatile functions at the appliances to achieve the intended tasks without requiring to provide the equivalent functions to the appliance.

It is noted that since the mobile TP program can determine to move or stay based upon the user's request analyzed at the instruction interpreting module, it is preferred to additionally include the appliance control module 37 as provided in the stationary TP program so that the mobile TP program can also acts as the stationary TP program as necessary for controlling the non-sophisticated appliances not equipped with the computer terminal.

In the above system configuration exploiting the mobile TP program, it is equally possible to include additional server which provides the same application operating environment as the HAS so that the mobile program can move also to and from the additional server. This is particularly advantageous when it is required to expand the in-house network for accommodating an increased number of the appliances which are not afforded by the single HAS.

It is noted that the system of the present invention can take any combination of the features disclosed herein to accomplish the afore-mentioned and other objects.

What is claimed is:

1. A voice control system for operating home electrical appliances, said system comprising:
    a home agent server (HAS) configured to be installed in a house and connected to the home electrical appliances for controlling operation of the home electrical appliances;
    a microphone and a speaker linked to said home agent server through an in-house network;
    a voice recognition unit configured to recognize a user's voice request received at the microphone;
    a transaction processing program (TP) executable at the HAS and configured to manage the home electrical appliances, said TP program having an instruction interpreting module configured to prepare from the voice request a particular instruction indicating a destined appliance and a method for controlling the destined appliance, and to provide an output command for controlling the destined appliance in accordance with the particular instruction;
    a plurality of human presence sensors configured to be installed in different rooms of the house and linked to said HAS, said plurality of human presence sensors configured to sense a presence of the user and to provide a detection signal indicative of a particular one of the rooms where the presence of the user is sensed; and
    a room locating module configured to identify the particular room based on the detection signal, and to instruct to issue voice message confirming an acceptance of the user's request or a completion of the particular instruction from the speaker belonging to the identified room, said room locating module included in one of said TP program and said HAS.

2. The system as set forth in claim 1, wherein
    said output command is a control signal configured to control the destined appliance for control thereof.

3. The system as set forth in claim 2, wherein
    one of said TP program and said HAS further includes a voice locating module configured to judge a place of the user issuing the user's voice request received at the microphone, and to instruct to issue the voice message from the speaker belonging to the located place.

4. The system as set forth in claim 1, wherein
    said TP program is written into a mobile agent program configured to move from the HAS to a local computer terminal included in the destined appliance in response to said output command such that it can be executed at the local computer terminal for control of the destined appliance.

5. The system as set forth in claim 4, wherein
    said TP program includes a voice recognition module configured to define said voice recognition unit.

6. The system as set forth in claim 5, wherein one of said TP program and said HAS includes:
    a text composer module configured to provide a text associated with a particular control of the electrical appliance; and
    a speech synthesis module configured to convert the text into the voice message to be issued from said speaker.

7. The system as set forth in claim 6, wherein
    said system further includes a personal computer equipped with a display in addition to the microphone and the speaker, said personal computer being linked to the HAS through the in-house network for transmitting the user's request received at the microphone to the TP program running on the HAS, said TP program having a function of transmitting the text provided by said text composer module to the display of the personal computer.

8. The system as set forth in claim 4, wherein
said TP program includes a migration module configured to analyze the particular instruction to seek an associated address of said destened appliance, and to move the TP program itself to the local computer terminal of said destened appliance.

9. The system as set forth in claim 8, wherein
said HAS is provided with a communication interface configured to link the HAS to said in-house network and to an outer information network for intercommunication with other sites linked through the information network, said HAS further including an address list configured to store addresses of the appliances and sites which are sought by the MAP running on the HAS to designate a destened appliance or site where an intended process demanded by the user's request is to be executed, said migration module allowing to move the MAP itself to the destened appliance or site for execution of the MAP at the destened appliance to achieve the intended process demanded by the user's request.

10. The system as set forth in claim 8, wherein
said HAS includes a phone interface to a public telephone network for intercommunication with a mobile phone, said mobile phone carrying a specific transaction processing (TP) program configured to move from the mobile phone to said HAS or said local computer terminal to be executable at said HAS or said local computer terminal, said specific TP program, when running on the mobile phone, accepting a user's voice request at the mobile phone for managing said appliances, said specific TP program including:

a voice recognition module configured to recognize a users s voice request received at the mobile phone, an instruction interpreting module configured to prepare from the voice request a particular instruction indicating a destened appliance and a method for controlling the destened appliance, and a migration module which, in response to the particular instruction, moves the specific TP program to said HAS or said local computer terminal for achieving the method for the destened appliance.

11. The system as set forth in claim 4, wherein
said system includes a plurality of dedicated transaction processing (TP) programs configured to be allocated respectively to individual users for limiting one or more of the appliances accessible by the users, said HAS including a user identification module configured to identify the user from the user's voice request, to select one of the dedicated TP programs allocated to the identified user, and to allow the dedicated TP program to move to the destened appliance to be executed at the destened appliance.

12. The system as set forth in claim 4, wherein said HAS includes said voice recognition unit.

13. The system as set forth in claim 12, wherein said HAS further includes:
means for providing a text associated with a particular control of the electrical appliance;
means for converting the text into the voice message to be issued from said speaker.

14. The system as set forth in claim 1, wherein
said HAS includes a personal information table configured to store a relation between individual users and the appliances allocated to be accessible by the individual users, said TP program further including:
a user identification module configured to identify a particular user from the user's voice request,
an access permission module configured to select the appliance allocated to the identified user with reference to the personal information table and to limit the TP program to the execution for the allocated appliance.

15. The system as set forth in claim 1, wherein
said HAS is provided with a communication interface configured to link the HAS to an outer information network for intercommunication with sites linked through the information network, said HAS including a site address list configured to store addresses of the sites which are referenced by the TP program to seek a destened site where an intended process demanded by the user's request is to be executed, whereby the TP is executed to communicate with the destened site for obtaining services provided by the destened site.

16. The system as set forth in claim 1, wherein
said system includes a plurality of dedicated transaction processing (TP) programs configured to be allocated respectively to individual users for limiting one or more of the appliances accessible by the users, said HAS including a user identification module configured to identify the user from the user's voice request, to select one of the dedicated TP programs allocated to the identified user, and to allow the dedicated TP program to be executed.

17. The system as set forth in claim 1, wherein
said HAS is packed into a home information and power distribution center which is provided with:
a distributor connected between a utility line and in-house branched power lines leading to the appliances;
a telephone interface configured for connection between an in-house telephone line and a public telephone network; and
an information interface configured for connection between an in-house information network and an external information network,
said in-house network being realized by said power lines which allows the output command to be transmitted therethrough.

18. The system as set forth in claim 1, wherein
said microphone and speaker are mounted in a switch box which is installed in the house.

19. The system as set forth in claim 1, wherein
said microphone and speaker are mounted in a ceiling receptacle installed in the house for connection with a lighting fixture.

20. The system as set forth in claim 1, wherein
said microphone and speaker are mounted in a lighting fixture defining the home electrical appliance.

* * * * *

UNITED STATES PATENT AND TRADEMARK OFFICE
CERTIFICATE OF CORRECTION

PATENT NO. : 6,988,070 B2
APPLICATION NO. : 09/852727
DATED : January 17, 2006
INVENTOR(S) : Toshinobu Kawaski et al.

It is certified that error appears in the above-identified patent and that said Letters Patent is hereby corrected as shown below:

Column 5, line 62, change "26" to --25--.

Column 6, line 16, change "16" to --15--.

Column 6, line 62, change "62" to --52--.

Column 7, line 61, change "IS" to --is--.

Column 10, line 31, change "issue voice message" to --issue a voice message--.

Column 11, line 43, change "users s voice" to --user's voice--.

Signed and Sealed this

Twenty-second Day of August, 2006

JON W. DUDAS
*Director of the United States Patent and Trademark Office*